US012530796B2

(12) United States Patent
Yildirim et al.

(10) Patent No.: US 12,530,796 B2
(45) Date of Patent: Jan. 20, 2026

(54) SPIN ESTIMATION FOR MARKED OBJECTS

(71) Applicant: RAPSODO PTE. LTD., Singapore (SG)

(72) Inventors: Botan Yildirim, Singapore (SG); Sam Whitcomb, Singapore (SG); Batuhan Okur, Singapore (SG); Ali Erol, Izmir (TR)

(73) Assignee: Rapsodo Pte. Ltd., Singapore (SG)

( * ) Notice: Subject to any disclaimer, the term of this patent is extended or adjusted under 35 U.S.C. 154(b) by 157 days.

(21) Appl. No.: 18/230,109

(22) Filed: Aug. 3, 2023

(65) Prior Publication Data
US 2025/0045957 A1 Feb. 6, 2025

(51) Int. Cl.
G06T 7/73 (2017.01)

(52) U.S. Cl.
CPC .............. *G06T 7/75* (2017.01); *G06T 7/74* (2017.01); *G06T 2207/20084* (2013.01)

(58) Field of Classification Search
None
See application file for complete search history.

(56) References Cited

U.S. PATENT DOCUMENTS 7,428,318 B1 * 9/2008 Madsen ................. G06T 7/136
348/154
12,008,770 B2 * 6/2024 Suk ........................ G06V 20/00
2005/0233816 A1 * 10/2005 Nishino ................... G06T 7/246
473/131
2010/0210377 A1 * 8/2010 Lock ................... A63B 69/3658
473/409

(Continued)

FOREIGN PATENT DOCUMENTS

CN 115414647 A 12/2022
EP 2945121 B1 3/2018

(Continued)

OTHER PUBLICATIONS

Extended European Search Report in European Appln. No. 24190580.1, mailed on Jan. 17, 2025, 19 pages.

(Continued)

*Primary Examiner* — Gelek W Topgyal
(74) *Attorney, Agent, or Firm* — Fish & Richardson P.C.

(57) ABSTRACT

A spin-estimation system may include an image-capturing sensor positioned and configured to capture images of an object within a field of view of the image-capturing sensor. The spin-estimation system may be configured to perform one or more operations to analyze spin properties of the object. The operations may include setting an image capture framerate that corresponds to a minimum spin motion of the object, printing an orientation marker on an outer surface of the object, and capturing, by the image-capturing sensor at the set image capture framerate, images of the object after starting motion of the object. The operations may include isolating the object in each image to generate isolated object images. The operations may include generating an object marker segmentation map based on the isolated object images. A spin rate and a spin axis may be estimated based on the object marker segmentation map using deep learning approaches.

18 Claims, 16 Drawing Sheets

(56) References Cited

U.S. PATENT DOCUMENTS

| | | | | |
|---|---|---|---|---|
| 2011/0273562 | A1* | 11/2011 | Dawe | A63B 69/3658 |
| | | | | 348/139 |
| 2011/0299729 | A1* | 12/2011 | Dawe | G06T 7/246 |
| | | | | 382/103 |
| 2014/0191896 | A1* | 7/2014 | Johnson | G01S 13/58 |
| | | | | 342/104 |
| 2015/0321103 | A1* | 11/2015 | Barnett | H04N 13/344 |
| | | | | 345/419 |
| 2015/0350609 | A1* | 12/2015 | Kim | G06T 7/73 |
| | | | | 348/157 |
| 2015/0356744 | A1* | 12/2015 | Joo | G06T 7/254 |
| | | | | 473/198 |
| 2017/0200277 | A1* | 7/2017 | Keat | G06T 7/248 |
| 2020/0406118 | A1* | 12/2020 | Buscemi | A63B 71/0622 |
| 2021/0008417 | A1* | 1/2021 | Tuxen | A63B 43/06 |
| 2021/0220701 | A1* | 7/2021 | Suk | G06F 18/2113 |
| 2022/0339513 | A1* | 10/2022 | Beach | G09B 19/0038 |
| 2023/0218952 | A1* | 7/2023 | Ottenberg | A63B 43/008 |
| | | | | 473/475 |
| 2023/0264077 | A1* | 8/2023 | Tuxen | A63B 69/3658 |
| | | | | 473/569 |
| 2024/0157218 | A1* | 5/2024 | Chang | G06T 7/246 |

FOREIGN PATENT DOCUMENTS

| | | | |
|---|---|---|---|
| ES | 2561732 A1 | 2/2016 | |
| WO | WO-2022211377 A1 * | 10/2022 | A63B 24/0021 |

OTHER PUBLICATIONS

Shum et al., "Tracking the translational and rotational movement of the ball using high-speed camera movies," Paper, Presented at IEEE International Conference on Image Processing, Sep. 14, 2005, 4 pages.

Communication pursuant to Article 94(3) EPC in European Appln. No. 24190580.1, mailed on Nov. 24, 2025, 5 pages.

Tebbe et al., "Spin Detection in Robotic Table Tennis," Paper, 2020 IEEE International Conference on Robotics and Automation (ICRA), May 31, 2020-Aug. 31, 2020, 7 pages.

* cited by examiner

SPIN ESTIMATION FOR MARKED OBJECTS

The present disclosure generally relates to spin estimation for marked objects.

BACKGROUND

A moving object may be represented by properties of the moving object such as its position, launch speed, launch angle, spin rate, spin axis, and other environmental factors. The moving object may include objects used in sports such as balls. Evaluating the properties of the moving object may provide information regarding drag forces and lift forces acting on the moving object, which may provide insight into the flight path of the moving object.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a spin-estimation system may include an image-capturing sensor positioned and configured to capture images of an object within a field of view of the image-capturing sensor. The spin-estimation system may be configured to perform one or more operations to analyze spin properties of the object. The operations may include setting an image capture framerate that corresponds to a minimum spin motion of the object, printing an orientation marker on an outer surface of the object, and capturing, by the image-capturing sensor at the set image capture framerate, images of the object after starting motion of the object. The operations may include isolating the object in each image to generate isolated object images. The operations may include generating an object marker segmentation map based on the isolated object images. A spin rate and a spin axis may be estimated based on the object marker segmentation map.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Measuring a trajectory of an object during flight in a three-dimensional space may depend on movement-related properties, such as a launch speed, a launch angle, a spin rate, a spin axis, or any other ballistic characteristics of the object in flight, and/or environmental factors. Forces acting on the object during its flight, such as drag forces or lifting forces, may be affected by the movement-related properties of the object. Consequently, accurate measurement of such movement-related properties may facilitate improved estimation and/or modeling of the movement of the object. However, the objects may move at high speeds that make capturing accurate details relating to the objects and measuring movement-related properties of objects in real time more difficult.

The present disclosure relates to, among other things, a system and a method of measuring spin axis and spin rate of an object using captured images of the object during flight. Predefined marker patterns may be applied to the object such that an orientation of the object from any given viewpoint is clarified. Because the spin rate and the spin axis of a given object depends on analysis of the object from two or more different orientations, at least two images covering different views of the object are needed to measure the spin rate and the spin axis. A spin-estimation system according to the present disclosure may involve generating one or more object marker segmentation maps in which pairs of object marker segmentation maps may be used to independently provide spin rate estimations and spin axis estimations at particular instances. The independently provided spin rate and spin axis estimations may be fused to generate a single spin rate-axis estimation. Additionally or alternatively, three-dimensional environment may be generated to simulate object flight using different launch parameters, and the simulated object flight parameters may be used as a training dataset for deep-learning models configured to perform spin rate-axis estimation. Post-processing enhancement algorithms may be applied to the images of the object in flight and/or the spin rate-axis estimations to refine the estimation results by increasing estimation accuracy.

Embodiments of the present disclosure are explained with reference to the accompanying figures.

Figure 1A:
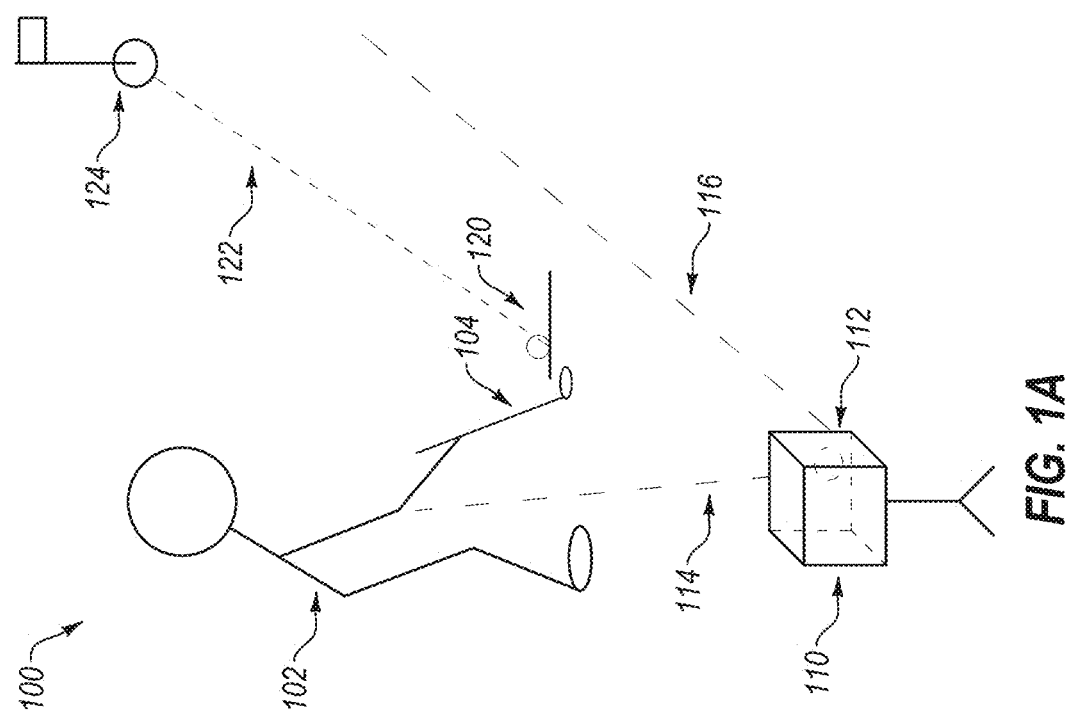
FIG. 1A illustrates an example embodiment of an environment including a spin-estimation system according to at least one embodiment of the present disclosure.
Figure 1B:
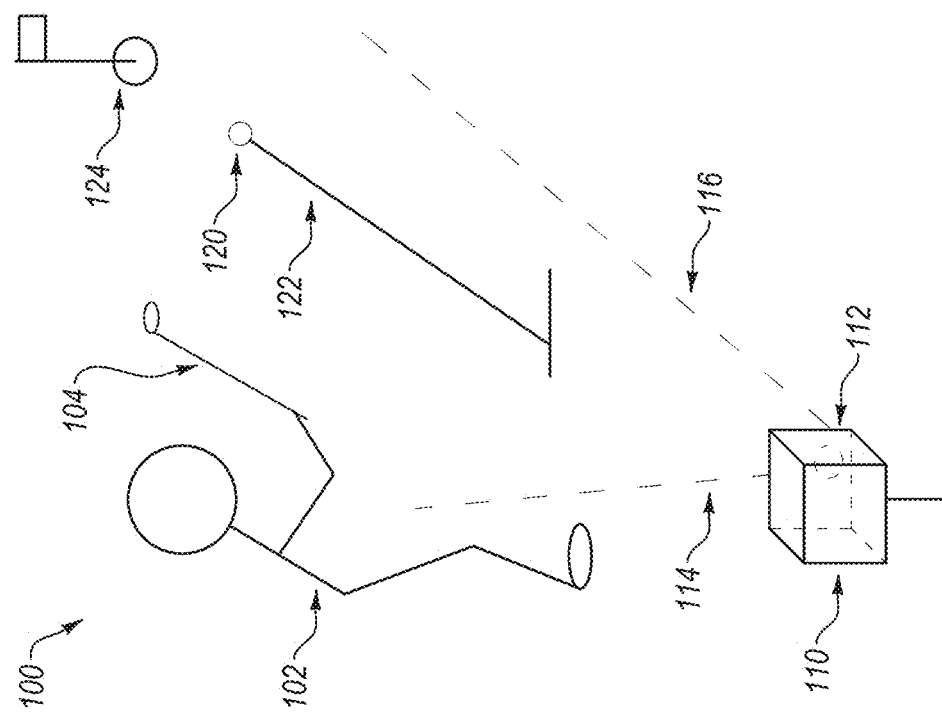
FIG. 1B illustrates a second view of the example embodiment of the environment including the spin-estimation system according to at least one embodiment of the present disclosure.

FIGS. 1A and 1B illustrate an example embodiment of an environment 100 including a spin-estimation system 110 according to at least one embodiment of the present disclosure in which FIG. 1A illustrates a first view of the environment 100 and FIG. 1B illustrates a second view of the environment 100. The spin-estimation system 110 may include a camera 112 or other image-capturing sensors that are positioned and configured to capture images within a field of view, such as a field of view bound by a first line 114 and a second line 116 as illustrated in FIGS. 1A and 1B.

In some embodiments, a force may be applied to an object 120 that causes the object 120 to move along a trajectory 122. As illustrated between FIGS. 1A and 1B, an actor 102 may apply the force to the object 120 by swinging a club 104 so that the object 120 moves along the trajectory 122 towards a destination 124. Although the environment 100 is illustrated as including the actor 102 and the club 104, the environment may or may not include the actor 102 or the club 104. For example, the camera 112 of the spin-estimation system 110 may be positioned to capture images of the object 120 mid-flight. In other words, the camera 112 may be positioned so that the first line 114 and the second line 116 are oriented so that the camera 112 captures images along a portion of the trajectory 122.

Figure 2:
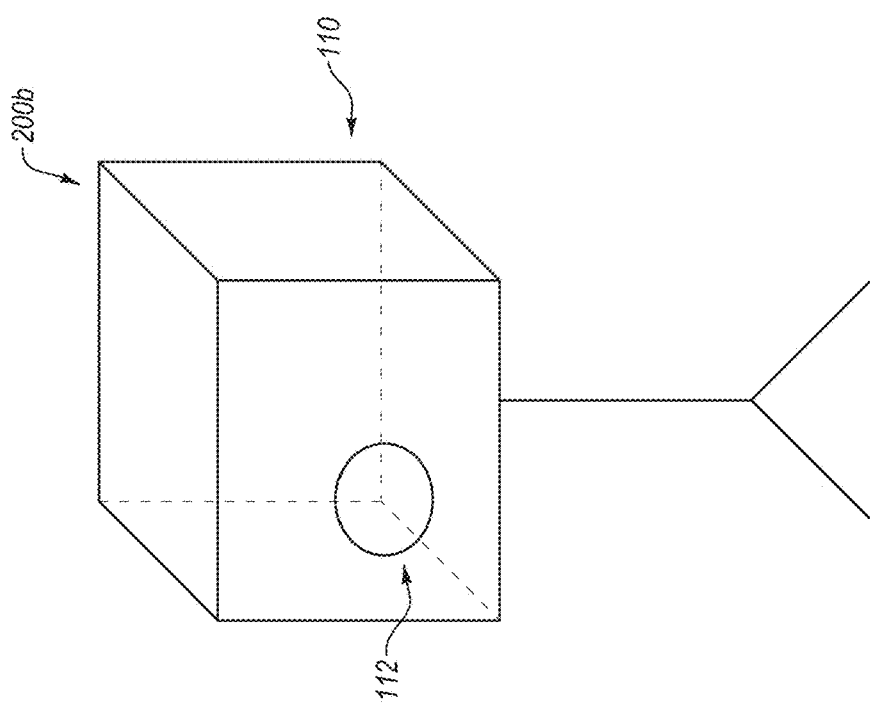
FIG. 2 illustrates a back view and a front view of the spin-estimation system according to at least one embodiment of the present disclosure.
Figure 2:
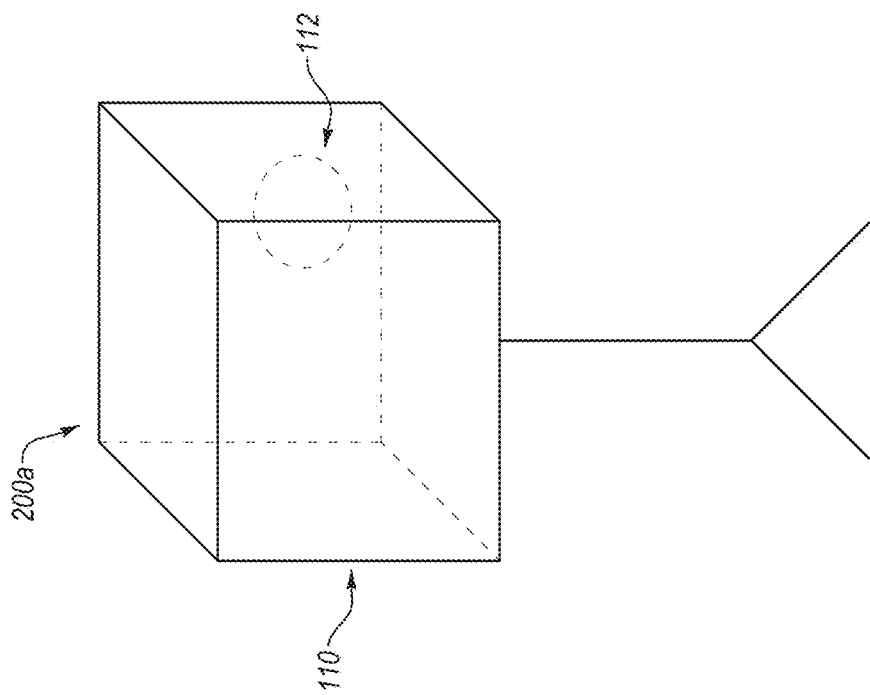

FIG. 2 illustrates a back view 200a and a front view 200b of the spin-estimation system 110 according to at least one embodiment of the present disclosure. In some embodiments, the spin-estimation system 110 may include the camera 112, which may be any device, system, component, or collection of components configured to capture images. The camera 112 may include optical elements such as, for example, lenses, filters, holograms, splitters, or any other components, and an image sensor upon which an image may be recorded. Such an image sensor may include any device that converts an image represented by incident light into an electronic signal. The image sensor may include a plurality of pixel elements, which may be arranged in a pixel array (e.g., a grid of pixel elements); for example, the image sensor may comprise a charge-coupled device (CCD) or complementary metal-oxide-semiconductor (CMOS) image sensor. The pixel array may include a two-dimensional array with an aspect ratio of 1:1, 4:3, 5:4, 3:2, 16:9, 10:7, 6:5, 9:4, 17:6, etc., or any other ratio. The image sensor may be optically aligned with various optical elements that focus light onto the pixel array, for example, a lens. Any number of pixels may be included such as, for example, 8 megapixels, 15 megapixels, 20 megapixels, 50 megapixels, 100 megapixels, 200 megapixels, 600 megapixels, 1000 megapixels, etc.

Various other components may also be included in the image-capturing sensors 120 and/or 130. Such components may include one or more illuminating features such as a flash or other light source, a light diffuser, or other components for illuminating an object. In some embodiments, the illuminating features may be configured to illuminate the moving object when it is proximate the image sensor, for example, when the moving object is within three meters of the image sensor.

In these and other embodiments, the camera 112 may be configured to operate between at or above a minimum framerate threshold in which the minimum framerate threshold is set based a spin rate range of the object 120. For example, a spin rate of a golf ball in a typical golf game may range from five hundred revolutions per minute (RPM) to twelve thousand RPM, and any cameras that operate below a framerate of two hundred frames per second (FPS) may fail to properly capture images of the object 120 if the object 120 spins at or near the upper end of the spin rate range due to aliasing effects.

The object 120 may spin at different spin rates depending on the application or the setting in which the object 120 and the camera 112 operate. For example, the object 120 may spin at a higher spin rate if a mechanical device is used to affect motion in the object 120, which may indicate that a camera used to capture images of the object 120 should operate at a higher framerate. In situations in which the object 120 spins at a higher rate than the capture framerate of the camera 112, an aliasing effect may occur if the object 120 revolves more than 360° between image captures by the camera 112. For example, a given object that has spun 40° may appear identical to the given object spinning 400°. Thus, the camera 112 may be selected or configured to capture images at a faster framerate than a maximum foreseeable spin rate of the object 120.

In some embodiments, the spin-estimation system 110 may include or be communicatively coupled to a computer system configured to process and analyze the images captured by the spin-estimation system 110. For example, the computer system may perform operations as described in further detail in relation to FIG. 5, 6, 7, or 8.

Modifications, additions, or omissions may be made to the environment 100 or the spin-estimation system 110 without departing from the scope of the present disclosure. For example, the designations of different elements in the manner described is meant to help explain concepts described herein and is not limiting. Further, the environment 100 or the spin-estimation system 110 may include any number of other elements or may be implemented within other systems or contexts than those described.

Figure 3A:
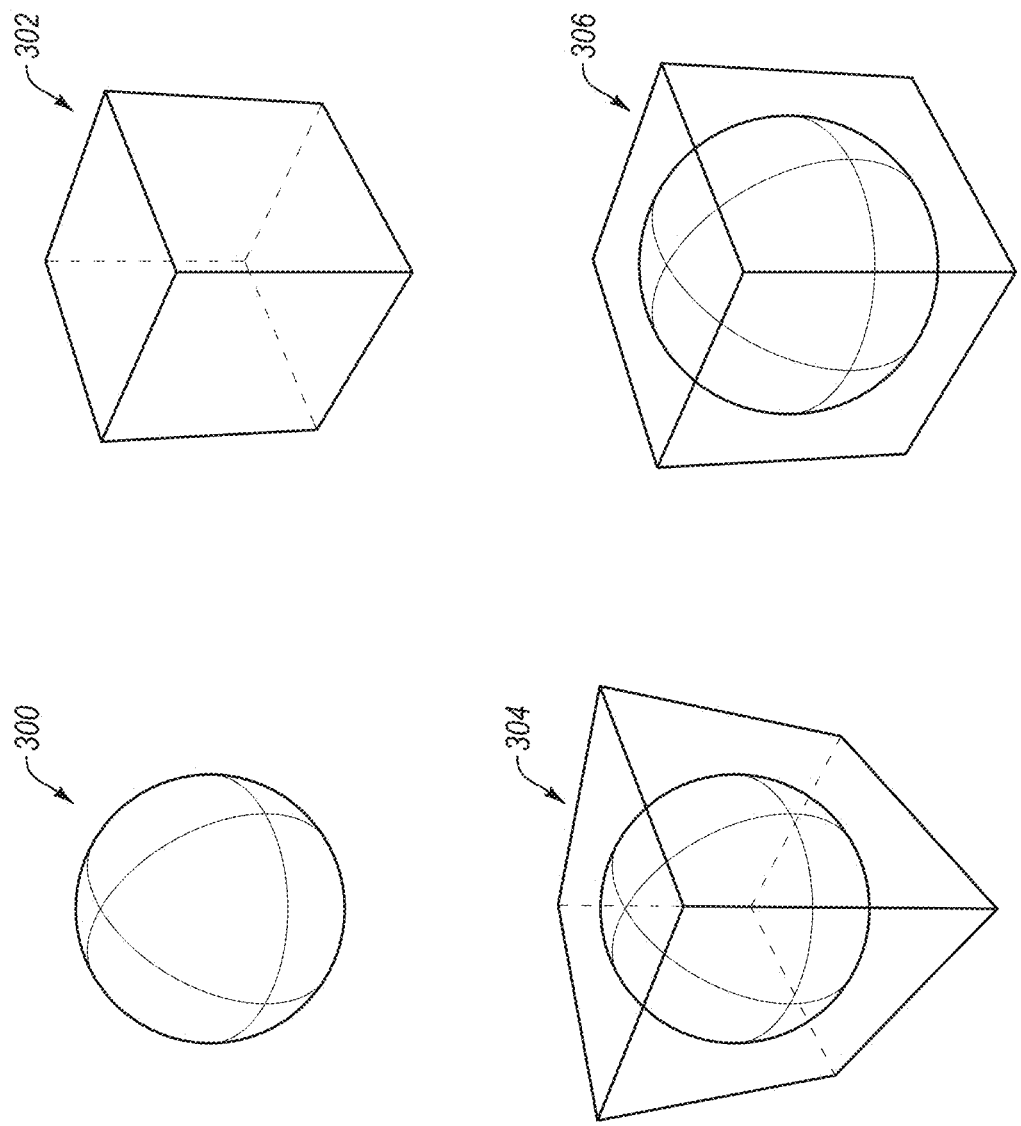
FIG. 3A illustrates a three-dimensional model of an object observed by the spin-estimation system and a three-dimensional cuboid model corresponding to the object according to at least one embodiment of the present disclosure.

FIG. 3A illustrates a three-dimensional model 300 of an object that may be observed by the spin-estimation system and an object mesh model 306 corresponding to the object according to at least one embodiment of the present disclosure. In some embodiments, the three-dimensional model 300 may be generated based on an object that would typically be observed by the spin-estimation system based on one or more given environments in which the spin-estimation system is likely to be deployed. For example, the three-dimensional model 300 may be shaped and sized based on golf balls if the spin-estimation system is likely to be deployed to analyze spin properties of golf balls in a golfing environment. As additional or alternative example, the three-dimensional model 300 may be shaped and sized based on soccer balls, baseballs, or any other spherical or spheroid object.

A three-dimensional cuboid model 302 may be generated based on the three-dimensional model 300 in which the three-dimensional cuboid model 302 is sized to enclose the three-dimensional model 300 as an enclosed object model 304. The enclosed object model 304 may be the basis of the object mesh model 306.

Although the three-dimensional model 300 is illustrated as a spherical model, the three-dimensional model 300 may additionally or alternatively be modeled as an ovoid or other round three-dimensional shapes. In these and other embodiments, the three-dimensional cuboid model 302 may be shaped and sized to correspond to the ovoid shape rather than a spherical shape as depicted in FIG. 3A. For example, the three-dimensional cuboid model 302 may include one or more edges that are longer or shorter than the other edges.

Figure 3B:
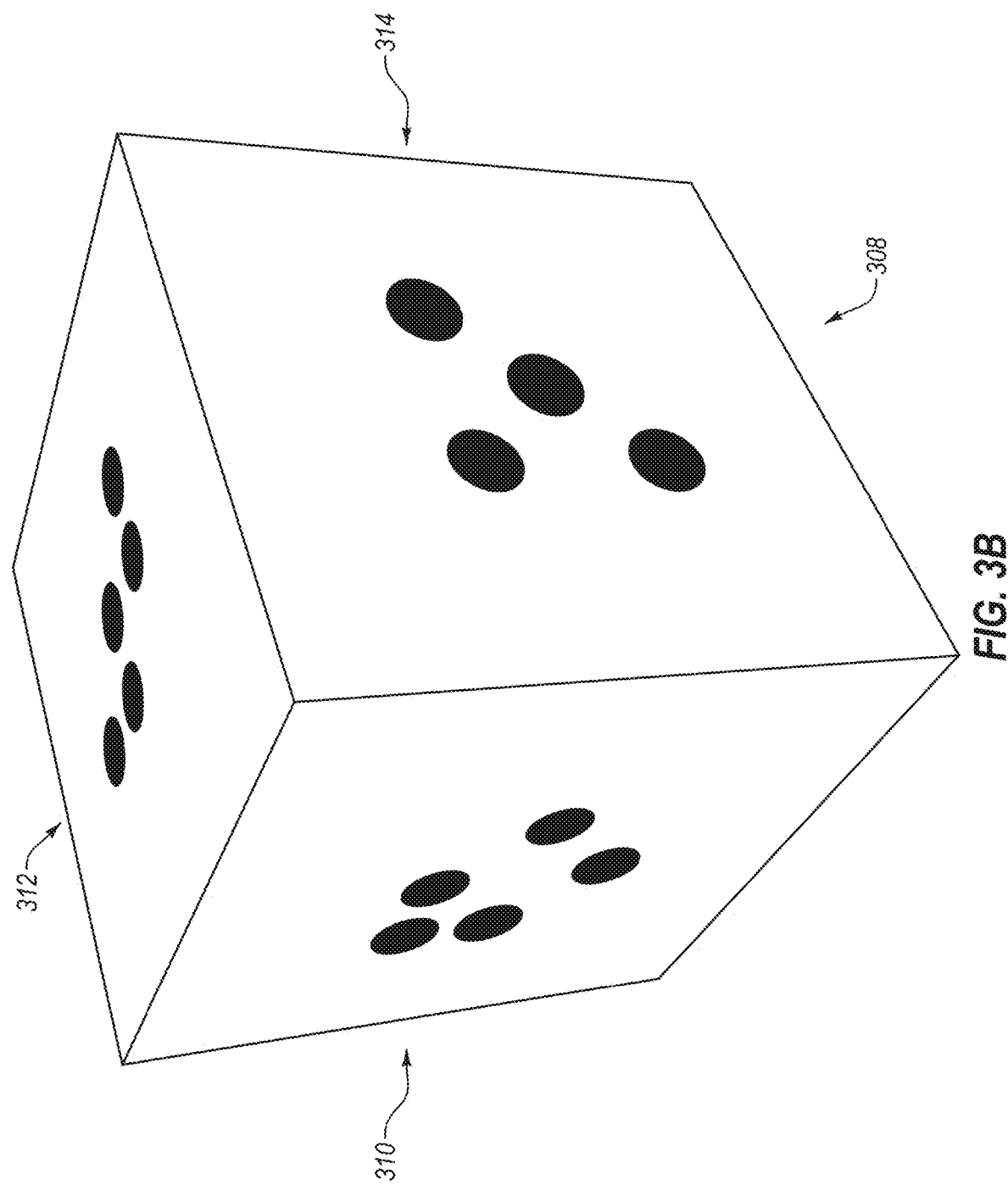
FIG. 3B illustrates a textured cuboid based on the three-dimensional cuboid model according to at least one embodiment of the present disclosure.

FIG. 3B illustrates a textured cuboid 308 based on the object mesh model 306 according to at least one embodiment of the present disclosure. In some embodiments, the textured cuboid 308 may be generated such that marker patterns 310, 312, and 314 may be printed on the outer surfaces of the object mesh model 306. Additionally or alternatively, the textured cuboid 308 may include a fourth marker pattern, a fifth marker pattern, or a sixth marker pattern that are not shown on the textured cuboid 308. Each of the marker patterns 310, 312, and 314 may be rotationally asymmetric and a different pattern from each other marker pattern 310, 312, and 314 such that the marker patterns 310, 312, and 314 are visually distinct from one another regardless of the orientation of the textured cuboid 308.

Figure 3C:
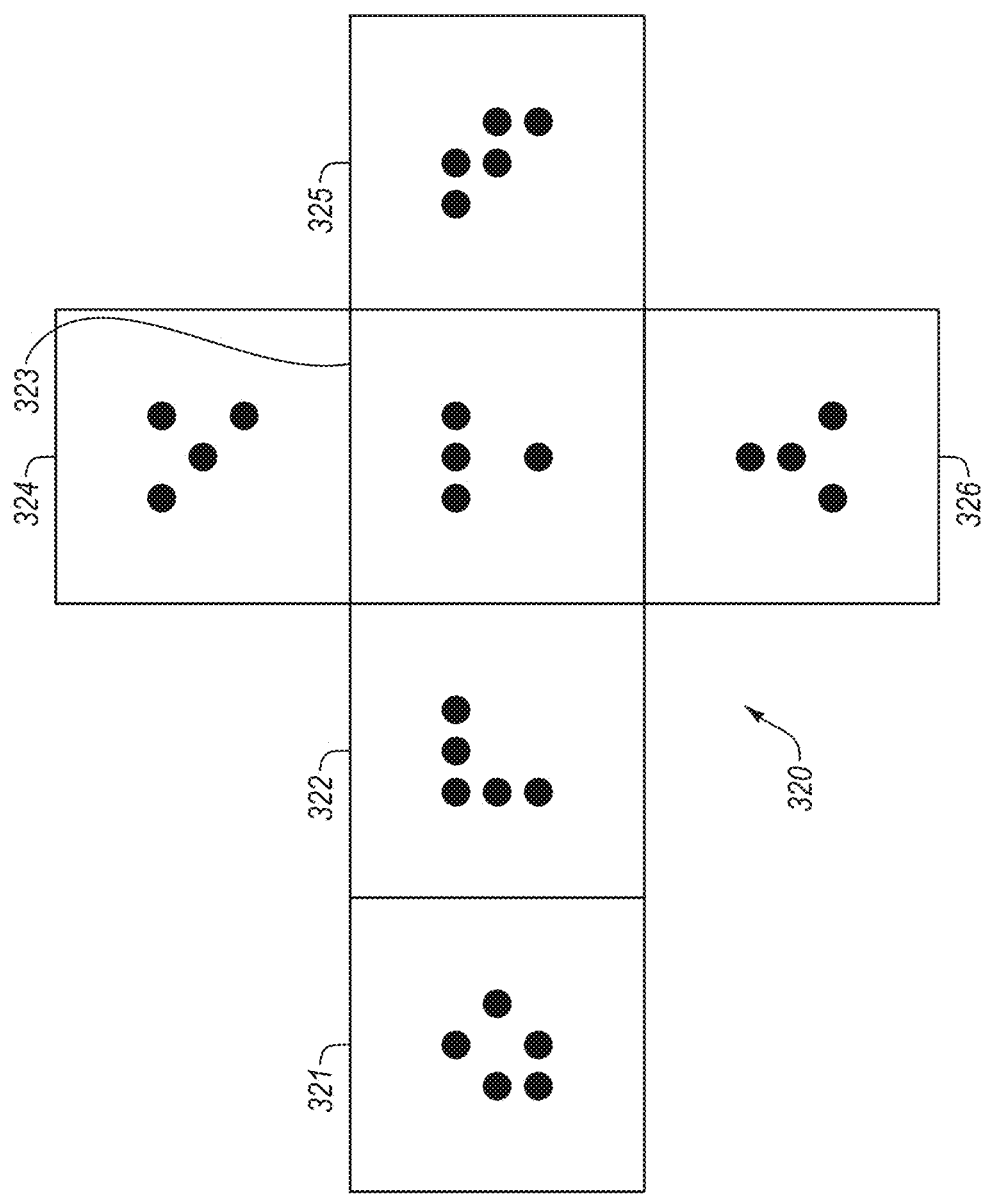
FIG. 3C illustrates an unwrapped marker texture based on the textured cuboid according to at least one embodiment of the present disclosure.

FIG. 3C illustrates an unwrapped marker texture 320 based on the textured cuboid 308 according to at least one embodiment of the present disclosure. The unwrapped marker texture 320 may include one or more marker patterns 321-326 that are asymmetrically different from one another. In some embodiments, the unwrapped marker texture 320 may be a template for forming the textured cuboid 308, such as by folding the unwrapped marker texture 320 to form a cube or cuboid shape.

In some embodiments, the unwrapped marker texture 320 may be resized, or one or more of the marker patterns 321-326 may be changed so that the unwrapped marker texture 320 may be tailored to different object shapes and dimensions. Designing, scaling, and applying the marker patterns 321-326 to a given object may be easier and more interpretable using the unwrapped marker texture 320 than directly applying one or more of the marker patterns 321-326 to a rounded surface of the object. Additionally or alternatively, generating the marker patterns 321-326 using the unwrapped marker texture 320 may be incorporated in existing marker printing processes that typically use flat-surface printing devices.

Figure 3D:
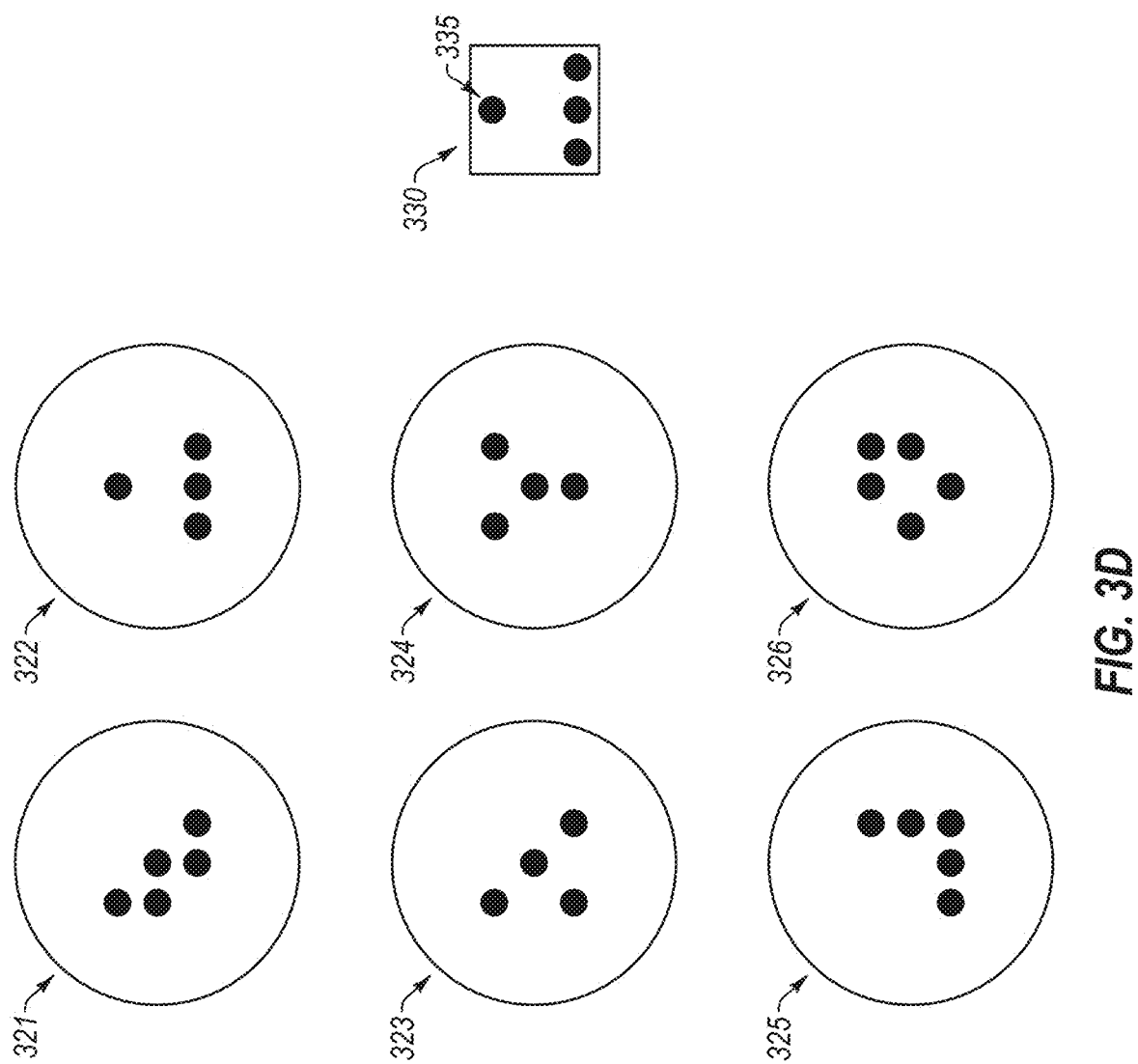
FIG. 3D illustrates individual marker patterns according to at least one embodiment of the present disclosure.

FIG. 3D illustrates the individual marker patterns 321-326 according to at least one embodiment of the present disclosure. In some embodiments, each of the marker patterns 321-326 may be formed within a pixel 330 having unit dimensions that may or may not be based on dimensions of an object on which the marker patterns 321-326 may be printed. One or more dots 335 may be arranged within the pixel 330 to form the marker patterns 321-326. The pixel 330 may be rotated to assess the rotational symmetry of each of the marker patterns 321-326.

Figure 4A:
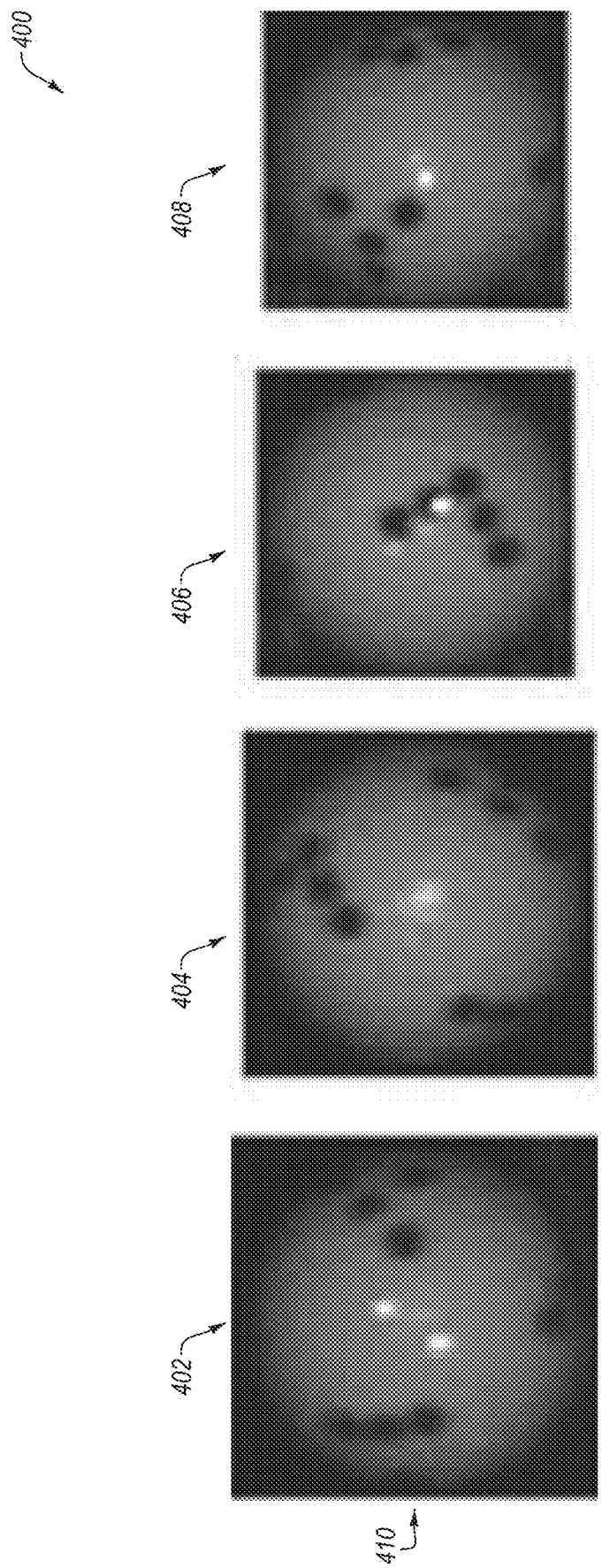
FIG. 4A illustrates examples of a textured object according to at least one embodiment of the present disclosure.

FIG. 4A illustrates examples of a textured object 400 from a first viewpoint 402, a second viewpoint 404, a third viewpoint 406, and fourth viewpoint 408 according to at least one embodiment of the present disclosure. The textured object 400 may include the object 120 as described in relation to FIGS. 1A and 1B with one or more marker patterns 410, which may be the same as or similar to the marker patterns 321-326 described in relation to FIGS. 3B-3D, printed onto the outer surface of the textured object 400. Because each of the marker patterns 410 may be rotationally asymmetrical and distinct from each other marker pattern 410 printed on the textured object 400, any two viewpoints, such as the first viewpoint 402 and the second viewpoint 404, may be visually different from one another.

Figure 4B:
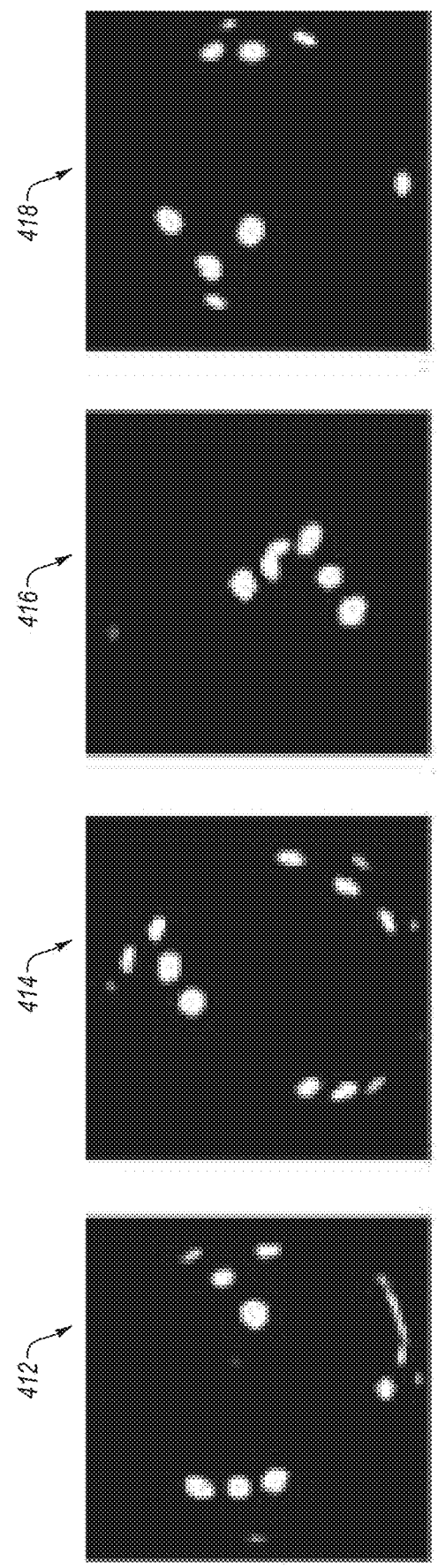
FIG. 4B illustrates examples of a binary map corresponding to the textured object according to at least one embodiment of the present disclosure.

FIG. 4B illustrates examples of a first viewpoint 412, a second viewpoint 414, a third viewpoint 416, and a fourth viewpoint 418 of a binary map corresponding to the first viewpoint 402, the second viewpoint 404, the third viewpoint 406, and the fourth viewpoint 408, respectively, of the textured object 400 according to at least one embodiment of the present disclosure. In some embodiments, the first, second, third, and fourth viewpoints 412, 414, 416, and 418 may be negative images of the first, second, third, and fourth viewpoints 402, 404, 406, and 408 of the textured object 400. In these and other embodiments, the negative images corresponding to the first, second, third, and fourth viewpoints 412, 414, 416, and 418 may represent binary images, such as binary maps 506 outputted by a binarization algorithm 504 as described in relation to operations 500 of FIG. 5. Because the textured object 400 may include a substantially light color (e.g., white), the textured object 400 itself may typically include a high pixel density. In comparison, the marker patterns 410 on the surface of the textured object 400 may include darker colors (e.g., black) to make the marker patterns 410 more visually contrasted from the rest of the outer surface of the textured object 400. Performing a negative operation on the textured object 400 to generate the binary maps illustrated in the first, the second, the third, and the fourth viewpoints 412, 414, 416, and 418 may increase a pixel value associated with portions of the surface of the textured object 400 that correspond to the marker patterns 410 and facilitate more accurate analysis of the positions of the marker patterns 410 on the surface of the textured object 400.

Figure 4C:
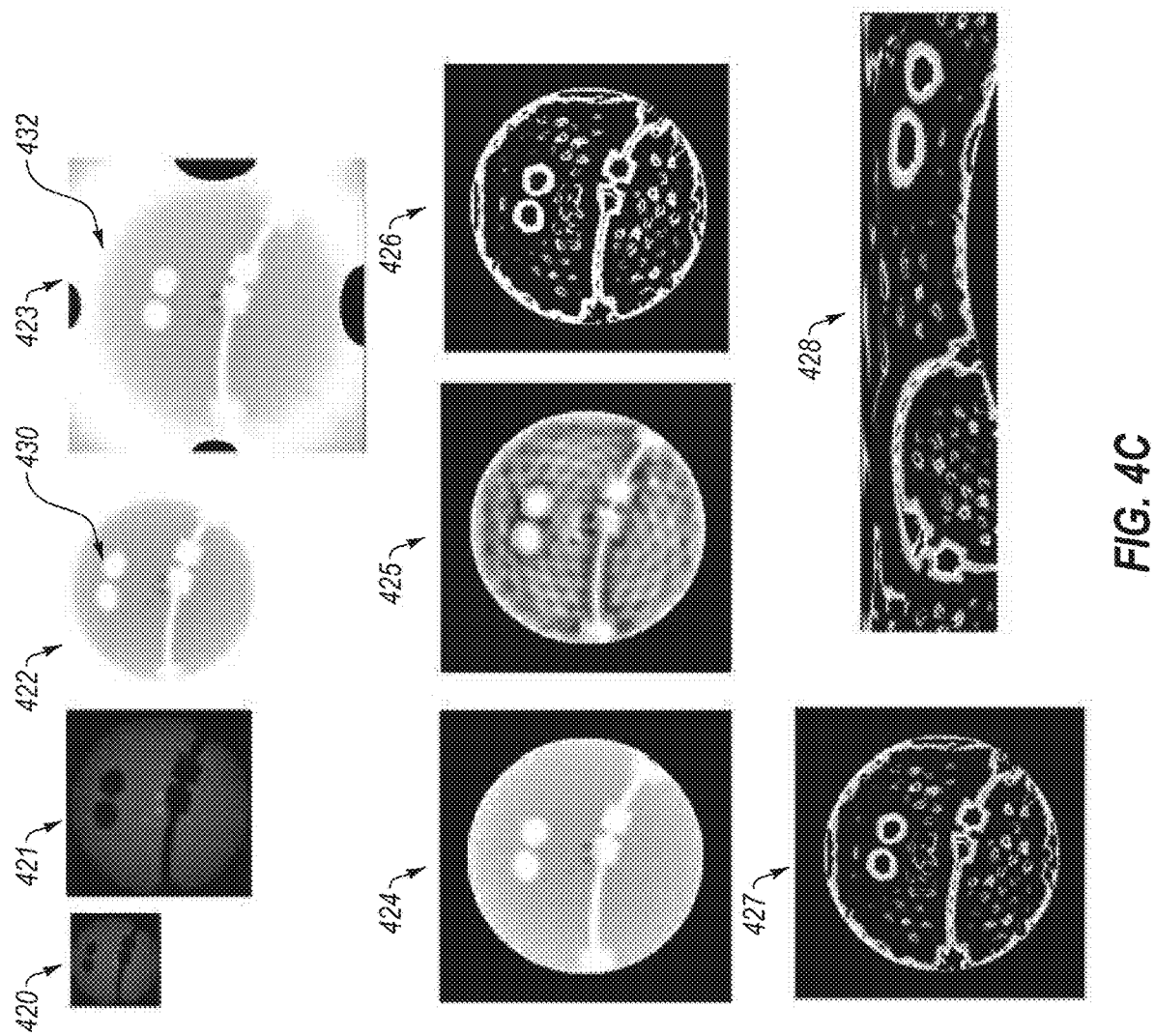
FIG. 4C illustrates operations that may be performed to enhance a given image of a textured object according to at least one embodiment of the present disclosure.

FIG. 4C illustrates operations that may be performed to enhance an image 420 of a textured object according to at least one embodiment of the present disclosure. In some embodiments, the image 420 of the textured object may include the images of the first viewpoint 402, the second viewpoint 404, the third viewpoint 406, or the fourth viewpoint 408 of the textured object 400 described in relation to FIG. 4A. The image 420 may represent object images 702 as described in relation to operations 700 of FIG. 7 or object images 802 as described in relation to operations 800 of FIG. 8. The image 420 may be enlarged to generate a resized image 421 of the textured object, which may correspond to resized objects 806 as described in relation to the operations 800 of FIG. 8. Because the textured object is typically in flight or otherwise moving relative to the camera that captured the image 400 of the textured object, the size of the textured object between image frames may be inconsistent. As such, one or more of the captured images of the textured object may be enlarged or shrunken, like the resized image 421, to make the sizes of the textured object in each of the frames of images consistent.

A negative operation may be applied to the resized image 421 to produce a negative image 422 so that the marker patterns 430 include higher pixel values are more easily analyzed. In some embodiments, the negative image 422 may correspond to negative objects 810 as described in relation to the operations 800 of FIG. 8. In some embodiments, a stretching operation may be applied to the negative image 422 to form a stretched image 423, which may correspond to stretched objects 814 as described in relation to the operations 800 of FIG. 8, that removes distortion of details along the edges of the negative image 422. Because the stretching operation may result in formation of visual artifacts 432 in the stretched image 423, a circular masking operation may be applied to filter out the visual artifacts 432 and generate a masked image 424 in which a background 434 of the image is removed without affecting clarity of the object and the marker pattern 430 in the masked image 424. In some embodiments, the masked image 424 may correspond to masked objects 818 as described in relation to the operations 800 of FIG. 8.

In some embodiments, a contrast operation may be applied to the masked image 424 to increase the contrast of surface features of the object depicted in the masked image 424 or of the marker pattern 430. In these and other embodiments, a histogram equalization algorithm may be used to generate a histogram equalized image 425 that may correspond to histogram equalized objects 822 as described in relation to the operations 800 of FIG. 8. Additionally or alternatively, the histogram equalization algorithm may include an adaptive binary thresholding component that removes details included in the histogram equalized image 425 to generate a simplified image 426, which may correspond to an output of an adaptive binary thresholding operation 824 as described in relation to the operations 800 of FIG. 8.

The simplified image 426 may be enhanced via an enhancement operation as enhanced image 427. In some embodiments, the enhanced image 427 may correspond to enhanced object images 708 as described in relation to the operations 700 of FIG. 7 or enhanced objects 828 as described in relation to the operations 800 of FIG. 8. A polar transformation operation, such as a polar transformation 710 described in relation to FIG. 7, may be applied to the enhanced image 427 to identify a rotational reference point of the enhanced image 427 and generate a polar image 428 based on the rotational reference point. In some embodiments, the polar image 428 may correspond to polar images 712 as described in relation to the operations 700 of FIG. 7.

Figure 5:
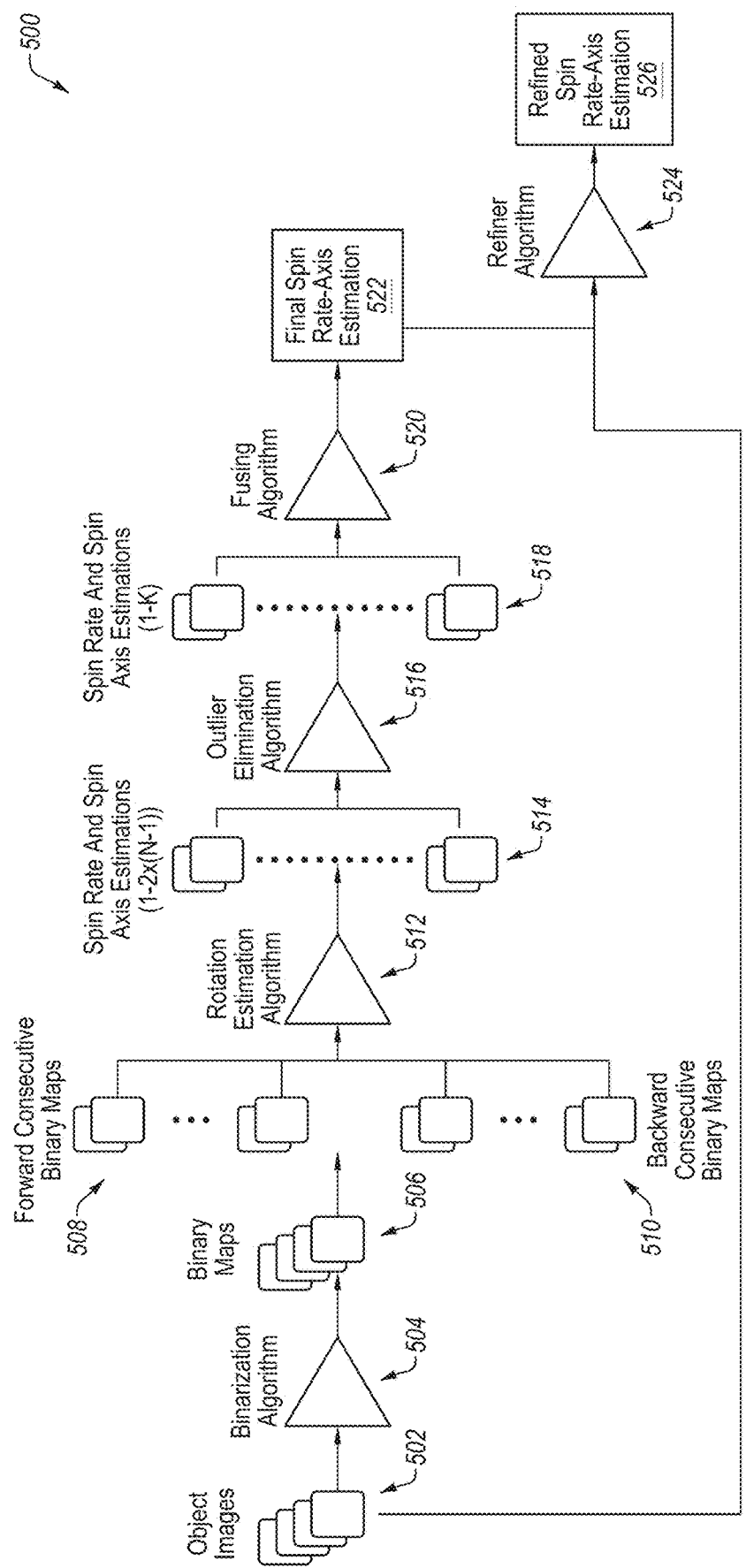
FIG. 5 is a flow diagram of operations associated with the spin-estimation system according to at least one embodiment of the present disclosure.

FIG. 5 is a flow diagram of operations 500 performed by the spin-estimation system relating to generation of refined spin rate-axis estimations 526 according to at least one embodiment of the present disclosure. The spin-estimation system may be configured to obtain object images 502 as described above in relation to FIGS. 1A, 1B, and 2. The operations 500 may be performed to generate refined spin axis-rate estimations 526 based on two or more of the object images 502.

The object images 502 captured or otherwise obtained by the spin-estimation system may be used as inputs to a binarization algorithm 504 to generate corresponding binary maps 506 associated with each of the object images 502. In some embodiments, the binarization algorithm 504 may include performing a resizing operation, a negative operation, a stretching operation, a masking operation, or any other operations on each of the object images 502 to convert the obtained object images 502 into the corresponding binary maps 506.

The binary maps 506 may be organized in a chronological or sequential order corresponding to the flight of the object from which the object images 502 were captured. In other words, the binary maps 506 may be sorted so that the object may be observed as following its flight path through each of the chronologically or sequentially organized binary maps 506. In the organized series of binary maps 506, each pair of consecutive binary maps may be identified as forward consecutive binary maps 508 responsive to being paired in a forward direction of the organized series (i.e., responsive to being viewed from a first binary map corresponding to a first captured object image to a last binary map corresponding to a last captured object image) or as backwards consecutive binary maps 510 responsive to being paired in a backwards direction of the organized series. For a given set of object images that includes N object images 502, the number of forward consecutive binary maps 508 may be N−1, and the number of backwards consecutive binary maps 510 may also be N−1.

The forward consecutive binary maps 508 and the backwards consecutive binary maps 510 may be used as inputs to a rotation estimation algorithm 512 to generate a corresponding spin rate and spin axis estimation 514 for each pair of forward consecutive binary maps 508 and for each pair of backwards consecutive binary maps 510. In some embodiments, the rotation estimation algorithm 512 may be performed using operations the same as or similar to operations 600 as described in relation to FIG. 6. Because N−1 forward consecutive binary maps 508 and N−1 backwards consecutive binary maps 510 may be input to the rotation estimation algorithm 512, the number of spin rate and spin axis estimations 514 may be 2(N−1) because a given spin rate and spin axis estimation may be generated for each pair of consecutive binary maps.

In some embodiments, the spin rate and spin axis estimations 514 may be passed through an outlier elimination algorithm 516 that analyzes each of the spin rate and spin axis estimations 514 and removes outlier estimations that are inconsistent with the rest of the spin rate and spin axis estimations 514 from the set of 2(N−1) spin rate and spin axis estimations 514. In these and other embodiments, a given spin rate and spin axis estimation may be considered an outlier estimation if the spin rate or the spin axis differs from a respective spin rate or a respective spin axis beyond a given threshold. Large differences between consecutive spin rate estimation components or spin axis estimation components may indicate that one or both of the consecutive estimation components was erroneously calculated, such as due to algorithmic computation errors, poor image binarization or other image processing problems, or for any other reasons. Additionally or alternatively, a particular spin rate and spin axis estimation may between a first spin rate and spin axis estimation and a second spin rate and spin axis estimation may be considered an outlier relative to the first spin rate and spin axis estimation and the second spin rate and spin axis estimation, while the first and the second spin rate and spin axis estimations are consistent with respect to one another. In these and other situations, the particular spin rate and spin axis estimation may be labeled as an outlier estimation by the outlier elimination algorithm 516, while the first and the second spin rate and spin axis estimations are not labeled as outlier estimations.

In some embodiments, the number of spin rate and spin axis estimations 518 input to a fusing algorithm 520 may be K in which K is less than or equal to 2(N−1) because one or more of the 2(N−1) spin rate and spin axis estimations 514 may be removed from the dataset by the outlier elimination algorithm 516. The K spin rate and spin axis estimations 518 output by the outlier elimination algorithm 516 may be input to the fusing algorithm 520 to determine a final spin rate-axis estimation 522 in which the final spin rate-axis estimation 522 provides an overall spin rate estimation and an overall spin axis estimation of the object from which the object images 502 were captured.

The final spin rate-axis estimation 522 and one or more of the object images 502 may be obtained by a refiner algorithm 524 that is configured to generate a refined spin rate-axis estimation 526 based on the obtained inputs. In some embodiments, determining the refined spin rate-axis estimation 526 using the refiner algorithm 524 may involve enhancing the obtained object images 502 and determining an updated value of the spin rate-axis estimation with the final spin rate-axis estimation 522 as a baseline or initial value. The enhancement of the object images 502 and finding refined spin rate-axis using the refiner algorithm 524 may be performed according to operations the same as or similar to the operations 700 as described in relation to FIG. 7.

Modifications, additions, or omissions may be made to the operations 500 without departing from the scope of the disclosure. For example, the designations of different elements in the manner described is meant to help explain concepts described herein and is not limiting. Further, the operations 500 may include any number of other elements or may be implemented within other systems or contexts than those described.

Figure 6:
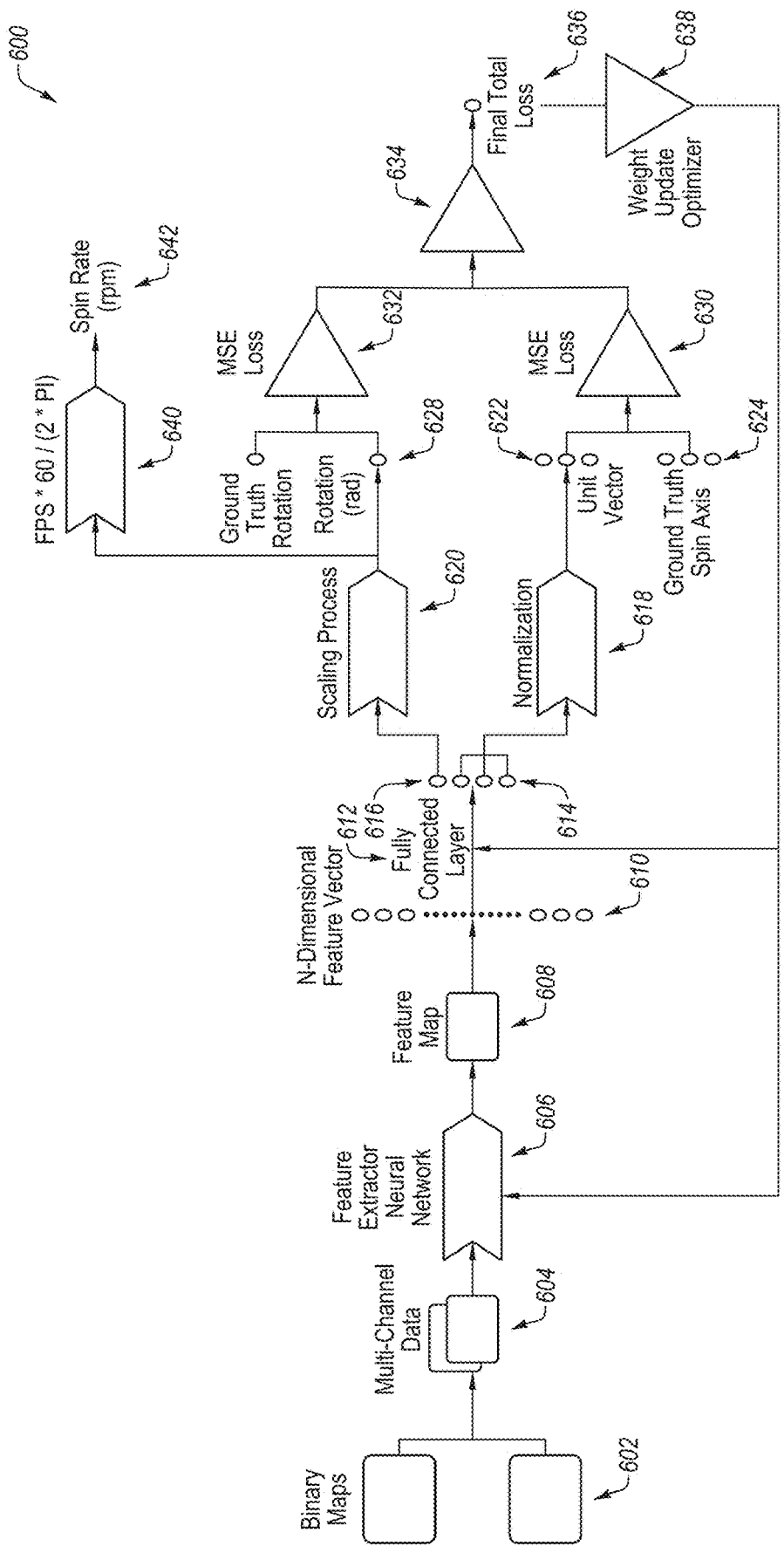
FIG. 6 is a flow diagram of a neural network configured to perform operations associated with the spin-estimation system according to at least one embodiment of the present disclosure.

FIG. 6 is a flow diagram of operations of a neural network 600 configured to perform operations associated with the spin-estimation system according to at least one embodiment of the present disclosure. In some embodiments, the spin-estimation system may be implemented using a deep-learning, machine learning, neural network, or any other artificial intelligence system, such as the neural network 600. Using the neural network 600 or any other artificial intelligence system with the spin-estimation system may facilitate determining one or more motion parameters associated with an analyzed object, such as a spin rate 642 and a spin axis 622.

The operations of the neural network 600 may involve obtaining one or more binary maps 602 that correspond to one or more images of an object being analyzed by the neural network 600. In some embodiments, the binary maps 602 may include the negative images represented in FIG. 4B and may be the same as or similar to the binary maps 506 described in relation to the operations 500 of FIG. 5. The images included in the binary maps 602 may be concatenated channel-wise to generate multi-channel data 604, which may be obtained by a feature extractor neural network 606 as a single stream of input data. In some embodiments, the multi-channel data 604 may represent two or more views of the object depicted from two or more consecutive frames, which may include information that facilitates determining a rotation amount, a rotation axis, other kinematic parameters, or some combination thereof about the object.

The feature extractor neural network 606 may be configured to generate a feature map 608 by processing the multi-channel data 604 according to a weight matrix in which elements of the weight matrix may indicate an importance of respective elements of the multi-channel data 604 for determining given outputs, such as the spin rate 642 and a spin axis 622. In some embodiments, the feature map 608 may be output by the feature extractor neural network 606 as a matrix, which may then be flattened into an N-dimensional feature vector 610. The N-dimensional feature vector 610 may be passed through a fully connected layer 612 of the neural network 600, which may be configured to process elements of the N-dimensional feature vector 610 and output a four-dimensional (4D) vector that includes a spin axis component 614 and a rotation component 616. For example, a given 4D vector may include three vector elements relating to a spin axis of a given object that represent the spin axis component 614 and one vector element relating to a rotation of the given object that represents the rotation component 616 as illustrated in FIG. 6.

In some embodiments, the spin axis component 614 may be input to a normalization process 618 that may be configured to output a unit vector 622 that represents an estimated spin axis vector. Additionally or alternatively, the rotation component 616 may be input to a scaling process 620 that may be configured to output a rotation estimation 628 measured in radians and ranging from 0 radians to $2\pi$ radians.

In some embodiments, the neural network 600 may be trained or improved by determining a mean square error (MSE) loss between the unit vector 622 representing the estimated spin axis value and the rotation estimation 628 and a respective set of ground truth spin axis values 624 and a respective set of ground truth rotation values 626. A spin axis MSE loss 630 may be computed based on a difference between the unit vector 622 and a corresponding spin axis value included in the set of ground truth spin axis values 624, and a rotation MSE loss 632 may be computed based on a difference between the rotation estimation 628 and a corresponding rotation value included in the set of ground truth rotation values 626. The spin axis MSE loss 630 and the rotation MSE loss 632 may be processed in a summing process 634 to compute a final total loss 636, which may represent a total difference between the estimated values corresponding to the unit vector 622 and the rotation estimation 628 and ground truth values corresponding to the set of ground truth spin axis values 624 and the set of ground truth rotation values 626, respectively. The final total loss 636 may be sent to a weight update optimizer 638 that may be configured to update the weight matrix applied to the feature extractor neural network 606 or/and the fully connected layer 612 such that subsequently determined unit vectors 622 or rotation estimations 628 may be more accurate and closer to corresponding ground truth values.

Modifications, additions, or omissions may be made to the neural network 600 without departing from the scope of the disclosure. For example, the designations of different elements in the manner described is meant to help explain concepts described herein and is not limiting. Further, the neural network 600 may include any number of other elements or may be implemented within other systems or contexts than those described.

Figure 7:
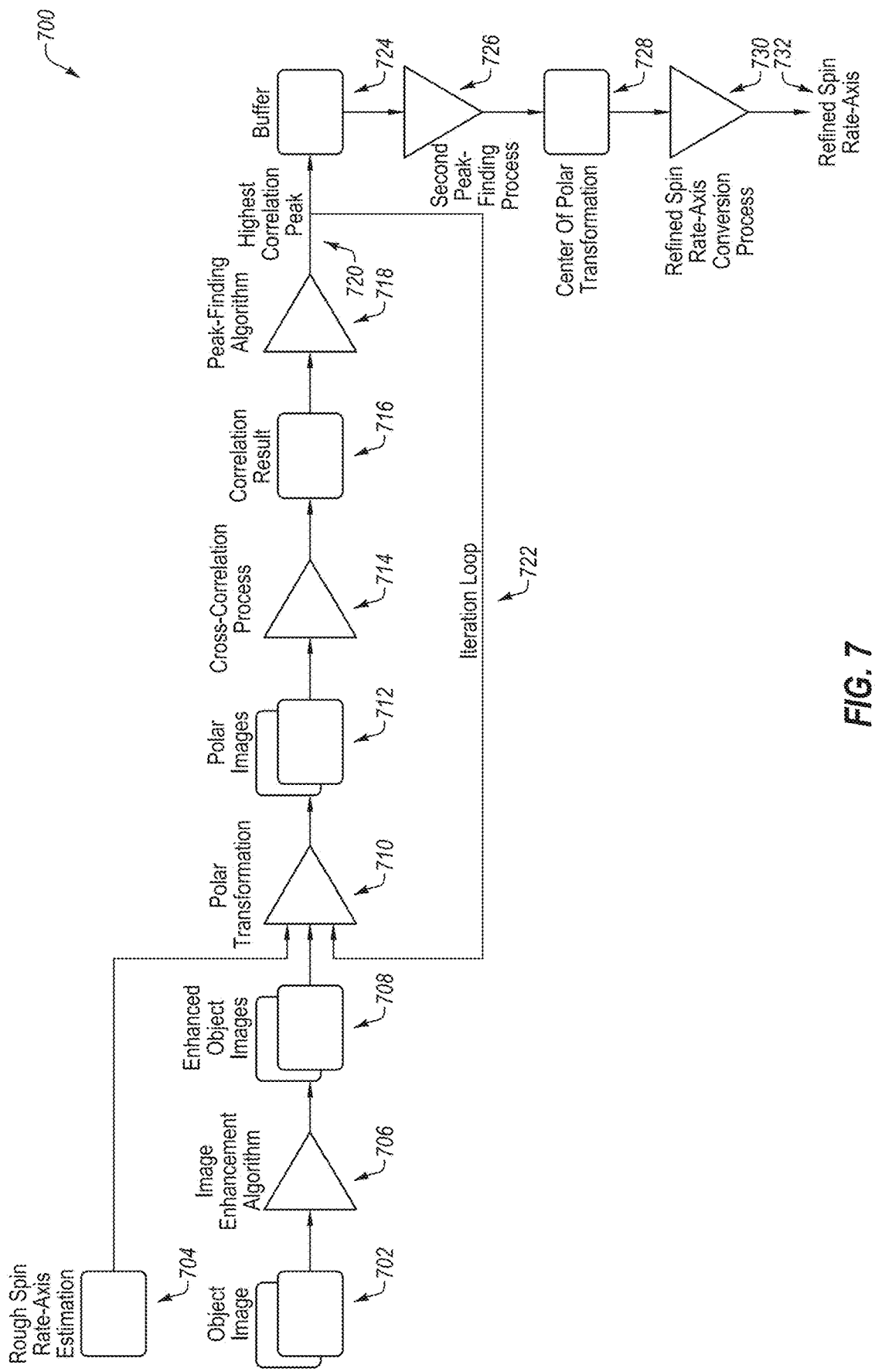
FIG. 7 is a flow diagram of a refiner algorithm involved in the spin-estimation system according to at least one embodiment of the present disclosure.

FIG. 7 is a flow diagram of the refiner algorithm 700 involved in the spin-estimation system according to at least one embodiment of the present disclosure. The refiner algorithm 700 may be implemented to generate a refined spin rate-axis estimation based on one or more obtained object image pairs and an initial spin rate-axis estimation, such as with the refiner algorithm 524 described in relation to FIG. 5.

Figure 8:
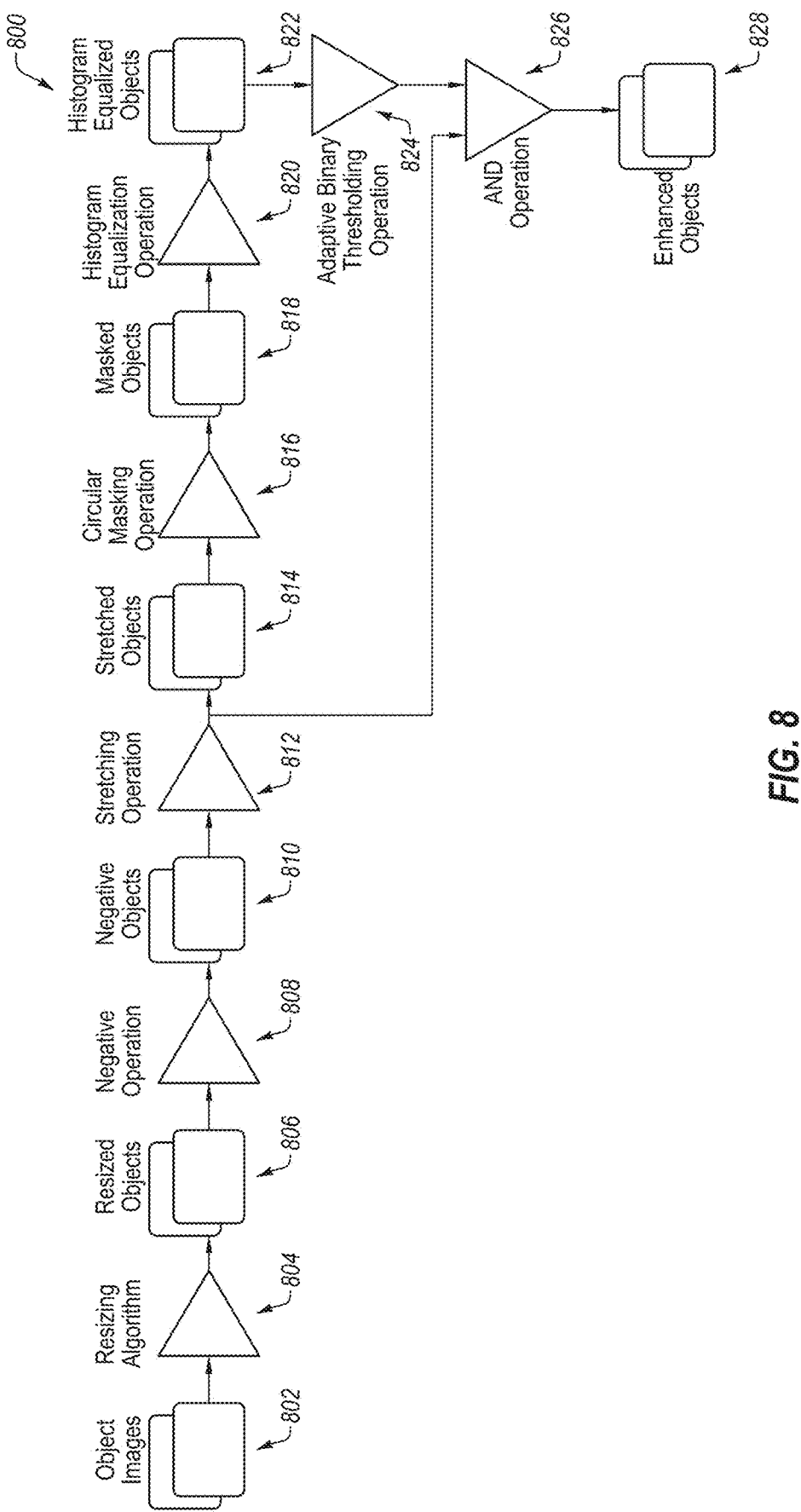
FIG. 8 is a flow diagram of an image enhancement algorithm involved in the spin-estimation system according to at least one embodiment of the present disclosure.

In some embodiments, one or more object images 702 may be used as inputs to an image enhancement algorithm 706 to output a corresponding number of enhanced object images 708 in which the image enhancement algorithm 706 may be performed according to operations that are the same as or similar to the operations 800 of FIG. 8. The enhanced object images 708 may be the same as or similar to the enhanced image 427 described in relation to FIG. 4C. A polar transformation 710 may be performed on the enhanced object images 708 based on a rough spin rate-axis estimation 704. The rough spin rate-axis estimation 704 may be used to find an initial guess for a center of the polar transformation 710, which may be represented by a coordinate (cx, cy), in which the center of the polar transformation 710 represents a reference point about which the enhanced images 708 may be rotated. Applying the polar transformation 710 to the enhanced images 708 may involve shifting the initial guess for the center by an interval amount, represented by (i, j), and converting the Cartesian coordinates of the enhanced images 708 to polar coordinates. As such, the enhanced images 708 may be translated and transformed into polar images 712.

Identifying a single refined spin rate-axis estimation 730 may involve combining the multiple enhanced images 708 into a single spin rate-axis estimation. As such, a cross-correlation process 714 may be applied to the polar images 712 to determine a correlation result 716 between the polar images 712. The correlation result 716 may provide a quantitative indicator of the similarities between the polar images 712 represented by correlation peaks that indicate how similar the polar images 712 are based on the heights of each of the correlation peaks. Based on the correlation result 716, a peak-finding algorithm 718 may be applied to identify the highest correlation peak 720.

In some embodiments, the peak-finding algorithm 718 may include an iterative processing which each iteration applies a different interval amount represented as a shift pair (i, j) for the polar transformation 710. For example, the shift pair, which may represent a translation distance for a given center of a given enhanced image 708, may range between a lower i bound, an upper i bound, a lower j bound, and an upper j bound. In this and other examples, the i-value may range from –4 to 4, and the j-value may range from –3 to 3 such that a total of 63 combinations of (i, j) shift pairs may be possible. An iteration loop 722 may involve applying each of the 63 combinations of shift pairs as inputs to the polar transformation 710. During each iteration loop 722, a different correlation result 716 and a different correlation peak 720 may be outputted based on the differences between the i-values or the j-values of the different shift pairs. In these and other embodiments, a particular shift pair and the correlation result 716 and the correlation peak 720 corresponding to the particular shift pair may be selected based on the correlation peak 720 corresponding to the particular shift pair having the greatest value. In these and other embodiments, iteratively identifying the highest correlation peak 720 may improve the results because the rough spin rate-axis estimation 704 used in a single iteration of the peak-finding process may or may not provide the most accurate results.

In some embodiments, identification of the highest correlation peak 720 from the iteration loops 722 may be facilitated by a buffer 724. The buffer 724 may be configured to obtain and store the correlation peak 720 from each iteration and the correlation result 716 associated with each of the obtained correlation peaks 720. For example, a value corresponding to the correlation peak 720, a peak location, or a polar transformation center associated with the correlation peak 720, may be stored in a buffer 724.

The highest correlation peak 720 included in the buffer 724 may be used in a second peak-finding process 726 that involves outputting a correlation peak location 720. In some embodiments, the second peak-finding process 726 may facilitate determination of a center of the polar transformation 728 having a Cartesian coordinate form (cx+i, cy+j). In these and other embodiments, the center of the polar transformation 728 may be determined by identifying a coordinate corresponding to the highest correlation peak 720 and shifting the polar images 712 by a distance corresponding to the coordinate of the highest correlation peak 720.

The center of the polar transformation 728 and the location of the highest correlation peak (location of peak in correlation result 718) may be input to a spin rate-axis conversion process 730 to determine a refined spin rate-axis 732. In some embodiments, the spin rate-axis conversion process 730 may involve mapping the center of the polar transformation 728 and the location of the highest correlation peak 720 from a polar coordinate system to a Cartesian coordinate system to identify the refined spin rate-axis 732 corresponding to a given object in the Cartesian coordinate system. In these and other embodiments, the location of the highest correlation peak 730 in a polar coordinate system may correspond to an amount of rotation of the given object in the Cartesian coordinate system, and the center of the polar transformation 728 may correspond to the axis of rotation of the given object in the Cartesian coordinate system.

FIG. 8 is a flow diagram of an image enhancement algorithm 800 involved in the spin-estimation system according to at least one embodiment of the present disclosure. The image enhancement algorithm 700 may be implemented to generate an enhanced object image from one or more obtained object images. In some embodiments, the image enhancement algorithm 700 may facilitate generating one or more of the resized image 421, the negative image 422, the stretched image 423, the masked image 424, the histogram equalized image 425, the simplified image 426, or the enhanced image 427 as described in relation to FIG. 4C. Any references to objects in the description of the image enhancement algorithm 800 may be interpreted as referring to images of the objects. For example, resized object 806, negative objects 810, stretched objects 814, masked objects 818, histogram equalized objects 822, and enhanced objects 828 may respectively refer to resized object images, negative object images, stretched object images, masked object images, histogram equalized object images, and enhanced object images rather than physical changes being made to the object itself from which the object images 802 are captured.

The image enhancement algorithm 800 may obtain object images 802 as inputs to a resizing algorithm 804 that outputs resized objects 806. The object images 802 may be the same as or similar to the object images 502 described in relation to FIG. 5 or the object images 702 described in relation to FIG. 7. Additionally or alternatively, the object images 802 may be the same as or similar to the images 420 described in relation to FIG. 4C.

In some embodiments, the resizing algorithm 804 may enlarge or shrink the object images 802 to the same or a similar size according to a reference radius. A first given object image 802 that depicts a first object having a smaller radius than the reference radius may be enlarged so that the radius of the first object is the same as or similar to the reference radius within a given threshold, while a second given object image 802 that depicts a second object having a larger radius than the reference radius may be shrunken accordingly.

A negative operation 808 may be applied to each of the resized objects 806 to increase the pixel values corresponding to one or more marker patterns imprinted on the outer surfaces of the resized objects 806 so that analysis of the marker patterns with respect to the spin rate and the spin axis of the object is more accurate. In some embodiments, the negative operation 808 may involve subtracting each pixel value of pixels included in the resized objects 806 from a maximum pixel value to generate corresponding negative images of the objects. The negative images of the resized objects 806 generated by the negative operation 808 may include low pixel values corresponding to sections of the resized objects 806 that included high pixel values, while sections of the negative images include high pixel values where the resized objects 806 included low pixel values. Because marker patterns imprinted on the resized objects 806 typically include darker colors and darker colors are typically associated with lower pixel values, the negative operation 808 may increase the pixel values of the marker patterns imprinted on the resized objects 806 and facilitate analysis of such marker patterns.

A stretching operation 812 may be applied to the negative objects 810 output by the negative operation 808 to generate the stretched objects 814. In some instances, details included near the edges in the object images 802, such as overall sizes of the object images 802, overall shapes of the object images 802, or positions of portions of the marker patterns, may be distorted along the edges of the object images 802 relative to such details appearing near the center of the negative objects 810 after processing by the resizing algorithm 804 or the negative operation 808. The stretching operation 812 may be applied to remove or lessen these and other distortion effects caused by the resizing algorithm 804 or the negative operation 808.

In some embodiments, the stretched objects 814 may be obtained by a circular masking operation 816 and a histogram equalization operation 820 to remove any visual artifacts generated by the stretching operation 812. The circular masking operation 816 may apply a mask to the stretched objects 814 that facilitates filtering out background details included in the stretched objects 814 as illustrated in FIG. 4C between the stretched image 423 and the masked image 424. In these and other embodiments, the histogram equalization operation 820 may increase the contrast of the masked objects 818 to generate the histogram equalized objects 822 as illustrated in FIG. 4C between the masked image 424 and the histogram equalized image 425. In some embodiments, the histogram equalization operation 820 may be succeeded by an adaptive binary thresholding operation 824 that involves simplifying the histogram equalized objects 822 as illustrated between the histogram equalized image 425 and the simplified image 426.

The histogram equalized objects 822, which may have been simplified via the adaptive binary thresholding operation 824, and one or more of the stretched objects 814 may be obtained by an AND operation 826 to generate enhanced objects 828. In some embodiments, the AND operation 826 may involve outputting a binary map in which each pixel included in the binary map has a pixel value of "1" or "0". The AND operation 826 may compare the stretched objects 814 and a binary map output by the adaptive binary thresholding operation 824 pixel by pixel and modify pixel values corresponding to the stretched objects 814 based on the comparison between the stretched objects 814 and the binary map output by the adaptive binary thresholding operation 824. For example, a given pixel value corresponding to a pixel of a given stretched object 814 may be converted to a "0" value responsive to determining that a pixel value of a corresponding pixel of the binary map output by the adaptive binary thresholding operation 824 has a pixel value of "0". As an additional or alternative example, a given pixel value corresponding to a pixel of a given stretched object 814 may remain unmodified from its original pixel value responsive to determining that a pixel value of a corresponding pixel of the binary map has a pixel value of "1". The enhanced objects 828 may represent versions of the object images 802 that are more easily analyzed. For example, the enhanced objects 828 may be the same as or similar to the enhanced images 708 described in relation to the operations 700 of FIG. 7 given that the object images 802 are the same as or similar to the object images 702. In some embodiments, the enhanced objects 828 may be used to estimate the spin rate-axis of the object on which the object images 802 are based as described in relation to the refined spin rate-axis estimation 730.

Figure 9:
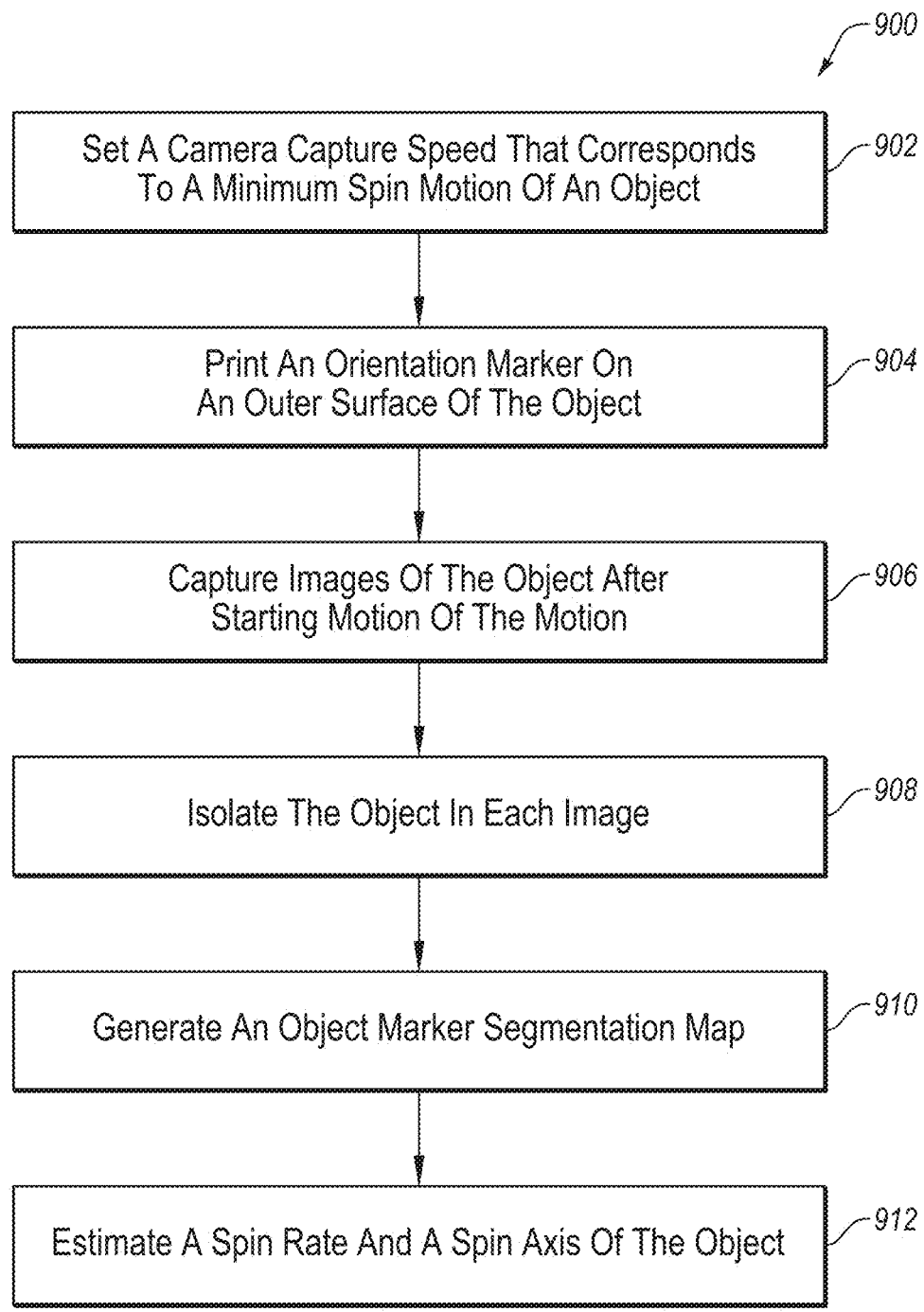
FIG. 9 is a flowchart of an example method of performing spin estimation according to at least one embodiment of the present disclosure.

FIG. 9 is a flowchart of an example method 900 of performing spin estimation according to at least one embodiment of the present disclosure. The method 900 may be performed by any suitable system, apparatus, or device. For example, one or more computer systems or software modules corresponding to the spin-estimation system 110 of FIG. 1 may perform one or more operations associated with the method 900. Although illustrated with discrete blocks, the steps and operations associated with one or more of the blocks of the method 900 may be divided into additional blocks, combined into fewer blocks, or eliminated, depending on the particular implementation.

The method 900 may begin at block 902, where an image capture framerate that corresponds to a minimum spin motion of an object may be set. In some embodiments, the image capture framerate may be configured to operate between at or above a minimum framerate threshold in which the minimum framerate threshold is set based a spin rate range of the object as determined by activities that in which the object may be typically involved. For example, a spin rate of a golf ball in a typical golf game may range from five hundred RPM to twelve thousand RPM, and any cameras that operate below a framerate of two hundred FPS may fail to properly capture images of the object if the object spins at or near the upper end of the spin rate range due to aliasing effects. As such, the image capture framerate may be set to at least two hundred FPS.

At block 904, an orientation marker may be printed on an outer surface of the object. The orientation marker on the outer surface of the object may be generated according to a three-dimensional cuboid model overlaid on the outer surface of the object in which each face of the three-dimensional cuboid model includes a unique marker pattern relative to each other face of the three-dimensional cuboid model such as described in relation to FIGS. 3A-3D. The marker patterns on each face of the three-dimensional cuboid model may each be rotationally asymmetric so that the orientation of the object during motion of the object may be determined at any point during the object's movement and rotation.

At block 906, images of the object may be captured after starting motion of the object. The images may be captured by an image-capturing sensor having the image capture framerate set at block 902.

At block 908, the object may be detected in each of the images captured at block 906 and isolated to generate isolated object images. In some embodiments, detecting the object included in each of the images may involve using a neural network based object detector to recognize one or more features relating to objects that are likely to be included in the images, such as ball objects used in particular sports games, other equipment used in the particular sports games, or any other objects. Additionally or alternatively, other digital image processing techniques may be used, such as applying a Circular Hough Transform to detect circular shapes included in the images that are likely to correspond to the object. Additionally or alternatively, a motion change detection algorithm, such as a Three Frame Difference algorithm, may be applied to detect the object from the rest of the image based on changes corresponding to movement of the object between three or more frames of images. In these and other embodiments, the detected object may be isolated by cropping the detected object from the image frames. In some embodiments, the images may be enhanced according to an image enhancement process, such as according to the operations 800 of FIG. 8. Each of the images may be resized, processed, stretched, or some combination thereof to generate standardized images that may be more readily compared to one another. For example, the resizing algorithm 804, the negative operation 808, the stretching operation 812, or some combination thereof as described in relation to the image enhancement algorithm of FIG. 8 may be applied to the images of the object to standardize the images of the object and facilitate comparability between the images. Detecting the object in each image of the plurality of images may involve applying a mask to each of the standardized images that filters out a background included in each image of the plurality. For example, a circular masking operation, a histogram equalization operation, an adaptive binary thresholding operation, or some combination thereof, such as the circular masking operation 816, the histogram equalization operation 820, the adaptive binary thresholding operation 824, the AND operation 826, or some combination thereof as described in relation to the image enhancement algorithm of FIG. 8, may be applied to the images of the object to filter out background information included in the object images and to facilitate detection of the objects included in the images.

At block 910, an object marker segmentation map may be generated based on the isolated object images. In some embodiments, generating the object marker segmentation map may involve binarizing each isolated object image and generating pairs of consecutive binarized object maps in which the object marker segmentation map includes all or some of the pairs of consecutive binarized object maps. In these and other embodiments, the object marker segmentation map may include multiple pairs of consecutive object images through which a spin rate and a spin axis may be determined by comparing the object as depicted in each of the images.

At block 912, a spin rate and a spin axis of the object in motion may be estimated based on the object marker segmentation map by following operations 500 of FIG. 5. Differences in the orientation, position, any other properties, or some combination thereof of the object depicted in any two given consecutive binarized object maps may be used to determine the spin rate and the spin axis. Additionally or alternatively, differences between an estimate spin rate or an estimated spin axis between different pairs of consecutive binarized object maps may be statistically analyzed to determine a single estimation of the spin rate and the spin axis of the object. In some embodiments, determining the spin rate or the spin axis between a given pair of consecutive binarized object maps may involve inputting the given pair of consecutive binarized object maps to a deep-learning algorithm trained using real-world images of objects that were annotated according to the objects' spin rates and spin axes so that the deep-learning algorithm may estimate the spin rate and the spin axis of the object depicted in the given pair of consecutive binarized object maps. Additionally or alternatively, the training of the deep-learning algorithm may be facilitated by synthetic data of consecutive binarized object maps generated in simulation environments.

For example, one or more of the estimated spin rates or one or more of the estimated spin axes associated with pairs of consecutive binarized object maps may be identified as outlier spin estimations. The estimated spin rates and estimated spin axes that are not identified as outlier spin estimations may be fused to determine the final estimated spin rate and the final estimated spin axis.

In some embodiments, estimating the spin rate and the spin axis of a given pair of consecutive binarized object maps may involve estimating a first object spin corresponding to each pair of consecutive binarized object maps in a forward direction and estimating a second object spin corresponding to each pair of consecutive binarized object maps in a backward direction. The first object spin and the second object spin may be compared to one another to determine the estimated spin rate and the estimated spin axis for the given pair of consecutive binarized object maps.

Modifications, additions, or omissions may be made to the method 900 without departing from the scope of the disclosure. For example, the designations of different elements in the manner described is meant to help explain concepts described herein and is not limiting. Further, the method 900 may include any number of other elements or may be implemented within other systems or contexts than those described.

Figure 10:
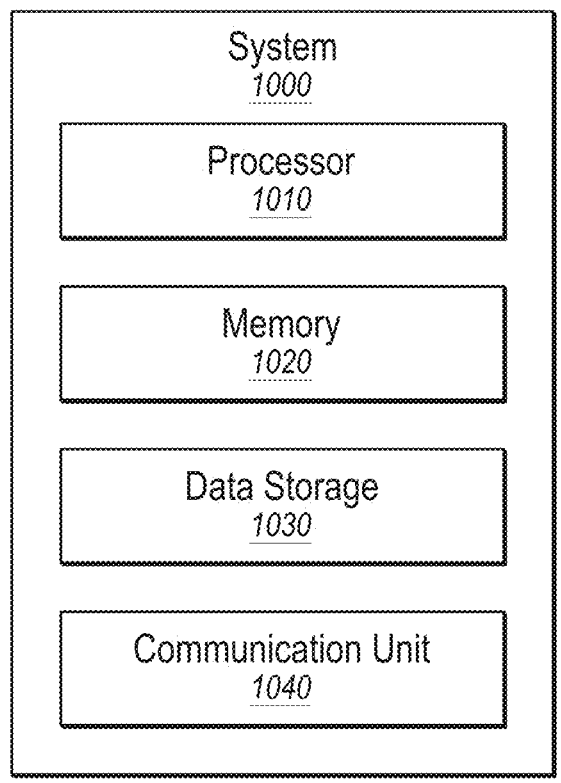
FIG. 10 is an example computer system.

FIG. 10 is an example computer system 1000, according to at least one embodiment described in the present disclosure. The computing system 1000 may include a processor 1010, a memory 1020, a data storage 1030, and/or a communication unit 1040, which all may be communicatively coupled. Any or all of the spin-estimation system 110 of FIG. 1 may be implemented as a computing system consistent with the computing system 1000.

Generally, the processor 1010 may include any suitable special-purpose or general-purpose computer, computing entity, or processing device including various computer hardware or software modules and may be configured to execute instructions stored on any applicable computer-readable storage media. For example, the processor 1010 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 10, it is understood that the processor 1010 may include any number of processors distributed across any number of network or physical locations that are configured to perform individually or collectively any number of operations described in the present disclosure. In some embodiments, the processor 1010 may interpret and/or execute program instructions and/or process data stored in the memory 1020, the data storage 1030, or the memory 1020 and the data storage 1030. In some embodiments, the processor 1010 may fetch program instructions from the data storage 1030 and load the program instructions into the memory 1020.

After the program instructions are loaded into the memory 1020, the processor 1010 may execute the program instructions, such as instructions to cause the computing system 1000 to perform the operations of the operations 500 of FIG. 5, one or more operations associated with the neural network 600 of FIG. 6, one or more operations associated with the refiner algorithm 700 of FIG. 7, one or more operations associated with the image enhancement algorithm 800 of FIG. 8, or the operations of the method 900 of FIG. 9.

The memory 1020 and the data storage 1030 may include computer-readable storage media or one or more computer-readable storage mediums for having computer-executable instructions or data structures stored thereon. Such computer-readable storage media may be any available media that may be accessed by a general-purpose or special-purpose computer, such as the processor 1010. For example, the memory 1020 and/or the data storage 1030 may include the object images 502, the binary maps 506, the spin rate and spin axis estimations 514, the spin rate and spin axis estimations 518, the final spin rate-axis estimation 522, or the refined spin rate-axis estimation 526 as described in relation to FIG. 5. In some embodiments, the computing system 1000 may or may not include either of the memory 1020 and the data storage 1030.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1010 to perform a particular operation or group of operations.

The communication unit 1040 may include any component, device, system, or combination thereof that is configured to transmit or receive information over a network. In some embodiments, the communication unit 1040 may communicate with other devices at other locations, the same location, or even other components within the same system. For example, the communication unit 1040 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 1040 may permit data to be exchanged with a network and/or any other devices or systems described in the present disclosure. For example, the communication unit 1040 may allow the system 1000 to communicate with other systems, such as computing devices and/or other networks.

One skilled in the art, after reviewing this disclosure, may recognize that modifications, additions, or omissions may be made to the system 1000 without departing from the scope of the present disclosure. For example, the system 1000 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    setting an image capture framerate that corresponds to a minimum spin motion of an object, wherein the object has an orientation marker printed on an outer surface of the object, and the orientation marker is generated according to a three-dimensional cuboid model overlaid on the outer surface of the object in which each face of the three-dimensional cuboid model includes a unique marker pattern relative to each other face of the three-dimensional cuboid model;
    capturing, by an image-capturing sensor having the set image capture framerate that corresponds to the minimum spin motion of the object, a plurality of images of the object after starting motion of the object;

isolating the object in each image of the plurality of images to generate a plurality of isolated object images;

generating an object marker segmentation map based on the plurality of isolated object images; and estimating a spin rate and a spin axis based on the object marker segmentation map.

2. The method of claim 1, wherein the image capture framerate is set to at least 200 frames per second.

3. The method of claim 1, wherein each marker pattern included on the face of the three-dimensional cuboid model is rotationally asymmetric.

4. The method of claim 1, wherein isolating the object in each image of the plurality of images comprises applying a mask to each image that filters out a background included in each image of the plurality.

5. The method of claim 1, wherein generating the object marker segmentation map comprises:

binarizing each isolated object image included in the plurality of isolated object images; and generating pairs of consecutive binarized object maps.

6. The method of claim 5, wherein estimating the spin rate and the spin axis comprise:

estimating an object spin corresponding to each pair of consecutive binarized object maps;

identifying one or more of the estimated object spins as outlier spin estimations;

fusing the estimated object spins that are not identified as the outlier spin estimations as the estimated spin rate; and estimating the spin axis based on the estimated spin rate.

7. The method of claim 6, wherein estimating the object spin corresponding to each pair of consecutive binarized object maps comprises inputting the pairs of consecutive binarized object maps to a deep-learning algorithm trained using a plurality of real-world images annotated according to object spin or a plurality of object images generated in a simulation environment.

8. The method of claim 6, wherein estimating the object spin corresponding to each pair of consecutive binarized object maps includes estimating a first object spin corresponding to each pair of consecutive binarized object maps in a forward direction and estimating a second object spin corresponding to each pair of consecutive binarized object maps in a backward direction.

9. One or more non-transitory computer-readable storage media configured to store instructions that, in response to being executed, cause a system to perform operations, the operations comprising:

setting an image capture framerate that corresponds to a minimum spin motion of an object, wherein the object has an orientation marker printer on an outer surface of the object, and the orientation marker is generated according to a three-dimensional cuboid model overlaid on the outer surface of the object in which each face of the three-dimensional cuboid model includes a unique marker pattern relative to each other face of the three-dimensional cuboid model;

capturing, by an image-capturing sensor having the set image capture framerate that corresponds to the minimum spin motion of the object, a plurality of images of the object after starting motion of the object;

isolating the object in each image of the plurality of images to generate a plurality of isolated object images;

generating an object marker segmentation map based on the plurality of isolated object images; and estimating a spin rate and a spin axis based on the object marker segmentation map.

10. The one or more non-transitory computer-readable storage media of claim 9, wherein the image capture framerate is set to at least 200 frames per second.

11. The one or more non-transitory computer-readable storage media of claim 10, wherein generating the object marker segmentation map comprises:

binarizing each isolated object image included in the plurality of isolated object images; and generating pairs of consecutive binarized object maps.

12. The one or more non-transitory computer-readable storage media of claim 11, wherein estimating the spin rate and the spin axis comprise:

estimating an object spin corresponding to each pair of consecutive binarized object maps;

identifying one or more of the estimated object spins as outlier spin estimations;

fusing the estimated object spins that are not identified as the outlier spin estimations as the estimated spin rate; and estimating the spin axis based on the estimated spin rate.

13. The one or more non-transitory computer-readable storage media of claim 12, wherein estimating the object spin corresponding to each pair of consecutive binarized object maps comprises inputting the pairs of consecutive binarized object maps to a deep-learning algorithm trained using a plurality of real-world images annotated according to object spin or a plurality of object images generated in a simulation environment.

14. The one or more non-transitory computer-readable storage media of claim 12, wherein estimating the object spin corresponding to each pair of consecutive binarized object maps includes estimating a first object spin corresponding to each pair of consecutive binarized object maps in a forward direction and estimating a second object spin corresponding to each pair of consecutive binarized object maps in a backward direction.

15. The one or more non-transitory computer-readable storage media of claim 9, wherein each marker pattern included on the face of the three-dimensional cuboid model is rotationally asymmetric.

16. The one or more non-transitory computer-readable storage media of claim 9, wherein isolating the object in each image of the plurality of images comprises applying a mask to each image that filters out a background included in each image of the plurality.

17. A spin-estimation system, comprising:

an image-capturing sensor positioned and configured to capture images of an object within a field of view of the image-capturing sensor;

one or more processors; and one or more non-transitory computer-readable storage media configured to store instructions that, in response to being executed, cause the spin-estimation system to perform operations, the operations comprising:

setting an image capture framerate that corresponds to a minimum spin motion of the object, wherein the object has an orientation marker printed on an outer surface of the object, and the orientation marker is generated according to a three-dimensional cuboid model overlaid on the outer surface of the object in which each face of the three-dimensional cuboid model includes a unique marker pattern relative to each other face of the three-dimensional cuboid model;

capturing, by the image-capturing sensor having the set image capture framerate that corresponds to the minimum spin motion of the object, a plurality of images of the object after starting motion of the object;

isolating the object in each image of the plurality of images to generate a plurality of isolated object images;

generating an object marker segmentation map based on the plurality of isolated object images; and estimating a spin rate and a spin axis based on the object marker segmentation map.

18. The spin-estimation system of claim 17, wherein:
each marker pattern included on the face of the three-dimensional cuboid model is rotationally asymmetric.

\* \* \* \* \*